United States Patent [19]
Jewell, Jr.

[11] 3,746,132
[45] July 17, 1973

[54] DISC BRAKE BACK-UP RELEASE SYSTEM

[75] Inventor: Lisle Allen Jewell, Jr., Davenport, Iowa

[73] Assignee: Kelsey-Hayes Company

[22] Filed: Nov. 6, 1970

[21] Appl. No.: 87,439

[52] U.S. Cl. .................................... 188/112, 303/7
[51] Int. Cl. .............................................. B60t 7/20
[58] Field of Search .................. 188/3 R, 134, 112; 303/7

[56] References Cited
UNITED STATES PATENTS

| | | | |
|---|---|---|---|
| 2,800,204 | 7/1957 | Wall | 188/112 |
| 3,175,649 | 3/1965 | Kirk et al. | 188/112 |
| 3,404,757 | 10/1968 | Beach et al. | 188/112 |

*Primary Examiner*—Duane A. Reger
*Attorney*—Harness, Dickey & Pierce

[57] ABSTRACT

A system for use as a brake back-up release in trailers, towed vehicles and the like, comprising a hydraulic circuit on the towed vehicle which includes a valve unit containing a three-way valve, a check valve, and an accumulator; a cam actuator means for actuating the valve unit upon backward movement of the towed vehicle; with the valve unit being operable to release brake fluid from the disc brakes upon any backward movement of the towed vehicle and also operable to store said brake fluid in the accumulator until forward movement of the towed vehicle is resumed and normal operation of the brake is desired.

1 Claim, 5 Drawing Figures

Patented July 17, 1973

INVENTOR.
Lisle Allen Jewell, Jr.
BY
Harness, Dickey & Pierce
ATTORNEYS.

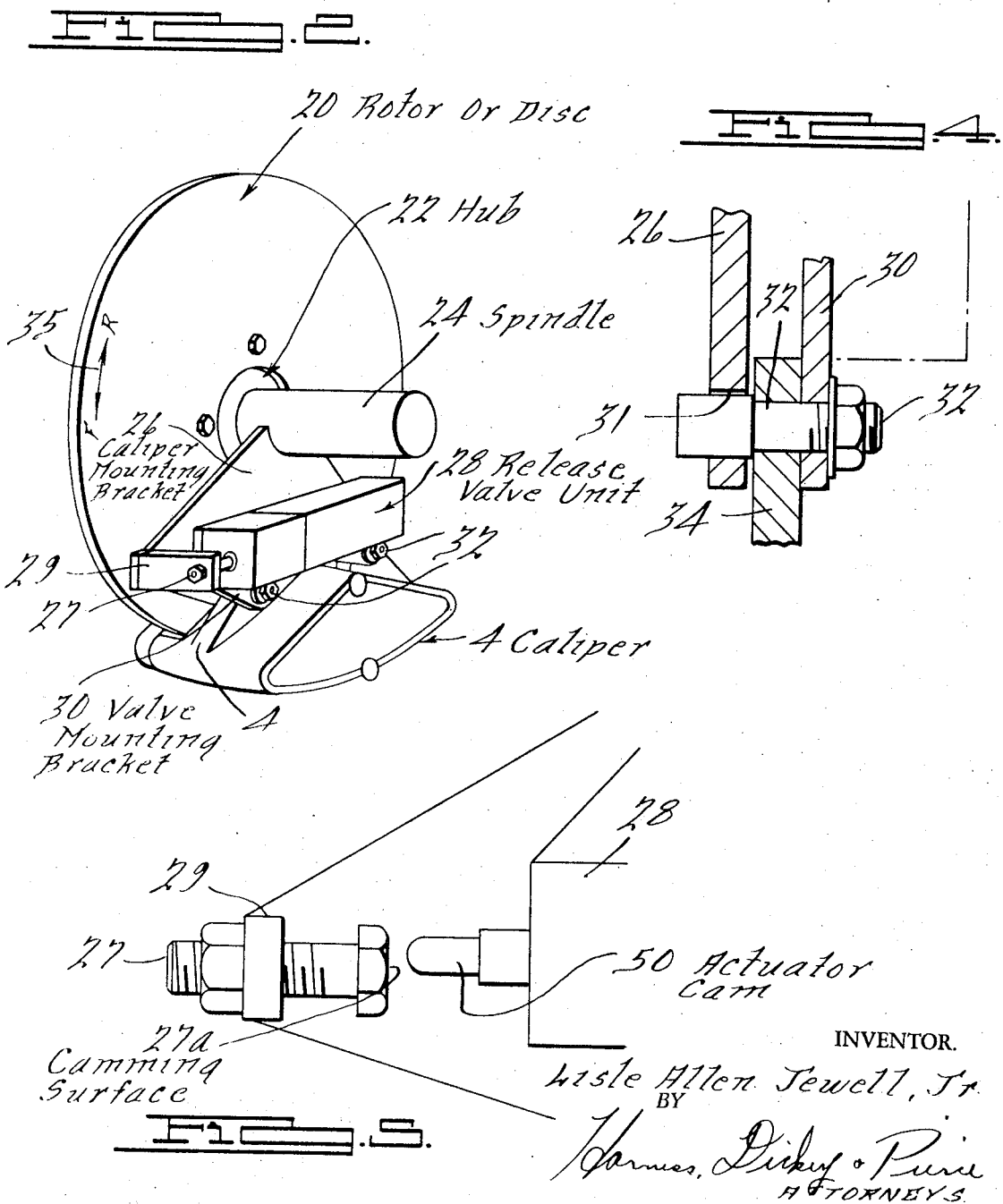

DISC BRAKE BACK-UP RELEASE SYSTEM

BACKGROUND OF THE INVENTION

This invention broadly relates to a system for releasing brakes on trailers, towed vehicles and other vehicles when the vehicle is being backed up or moved in a backward direction.

The unique and inventive system as disclosed herein has specific utility with trailer brakes actuated via a "surge controller" or through "hitch actuation." With such brake actuating systems on trailers or other towing vehicles the master cylinder and master cylinder actuating unit are normally mounted on the tongue or hitch of the vehicle, and the master cylinder is actuated (sometimes termed "hitch actuation") by the forward momentum of the towed vehicle against the towing vehicle when the brakes are applied in the towed vehicle. In the past, this type of hitch actuator braking has been a reliable and comparatively simple system, and provides brake actuation while permitting the trailer to be towed by a variety of different vehicles. Such prior art systems which actuate the brakes in a towed vehicle as a result of the forward momentum of the towed vehicle against the towing vehicle are exemplified in U. S. Pat. No. 3,175,649, the disclosure of which is hereby incorporated herein by reference.

However, the problem in such prior art systems has been that in reversing or backing up the towed vehicle, there was a tendency for the prior art systems to apply the brakes in the towed vehicle which, of course, rendered it difficult if not impossible to back up the towed vehicle due to the hitch actuation of the brakes. On the other hand, this problem of the prior art system was attempted to be solved in some instances by the use of brake systems which utilized a means of manually locking out the master brake cylinder in the towed vehicle such that it could not be actuated during backing up. However, due to human nature, this manual lock out was susceptible to being forgotten and the operator of the vehicle was apt to find out, possibly to his great disadvantage, that the braking system in the towed vehicle was actuated when it actually was not desired.

As discovered and disclosed herein, it has now been found that the disc brake back-up release system of this invention overcomes the problems of the prior art systems by uniquely utilizing the direction of rotation of the wheels on the towed vehicle in a specialized technique to release the brakes on the towed vehicle in an essentially foolproof and mistakeproof manner such that the braking system in the towed vehicle is always released when the vehicle is backed up, and yet, such that the braking system in the towed vehicle will always operate as desired when the vehicle is being towed in a normal forward direction.

The disc brake back-up release system of this invention generally operates as immediately disclosed hereinafter. A more specific and detailed description with reference to the drawings appears in a later section of this disclosure. When the master brake cylinder on the towed vehicle is actuated, in a conventional manner as disclosed in U.S. Pat. No. 3,175,649, due to the forward momentum of the towed vehicle pressing against the towing vehicle and with the wheels of the towed vehicle rotating forward, the brakes of the towed vehicle are applied in a normal and conventional manner; but, after the master cylinder is actuated with the wheels of the towed vehicle rotating in a reverse direction, then a unique release valve structure is actuated and hydraulic pressure is blocked from the master cylinder. Further, essentially at that same instant the hydraulic pressure is released from the caliper cylinders of the disc brakes on the towed vehicle into an accumulator. As the pressure is released from the caliper cylinders, the towed vehicle may be backed up or reversed indefinitely. However, when the wheels of the towed vehicle are returned to forward rotation and the master cylinder is returned to its deactuated condition, the accumulator then returns the hydraulic fluid back into the master cylinder through a check valve means which is integral with the release valve and the accumulator. Actuation of the release valve is disclosed to be accomplished by mounting it on one of the towed vehicle wheel calipers through the use of opposite ends of the caliper mounting bolts or studs that are used to mount the caliper on a caliper mounting bracket. The caliper mounting bracket is provided with two circumferential slots so that the caliper may rotate or move a very small distance, for example a quarter of an inch. In making this movement, a cam member is actuated during reverse rotation of the towing vehicle wheels to thereby release the disc braking system in the towed vehicle; and, during forward rotation of the towed vehicle wheels, the cam member returns to its original position automatically, thus allowing the braking system of the towed vehicle to operate in a normal fashion.

Accordingly, the object of this invention is to provide a novel disc brake back-up release system for use on trailers, towed vehicles and like vehicles.

Another object of the present invention is to provide a novel hydraulic circuit suitable for use as a disc brake back-up release system in trailers and like vehicles.

Other objects, features and advantages of the present invention will become apparent from the subsequent description and the appended claims taken in conjunction with the accompanying drawings.

BRIEF DESCRIPTION OF THE DRAWINGS

FIG. 2 illustrates a disc brake and a back-up release assembly typically shown as to be mounted on one wheel of the towed vehicle;

FIG. 4 illustrates a cross-sectional view taken along the line 4—4 of FIG. 3; and, FIG. 5 illustrates a view from the side of FIG. 2 showing how the release valve unit is mounted for actuation by contact with an adjusting screw cam surface.

SUMMARY OF THE INVENTION

Briefly stated, this invention comprises a system suitable for use as a disc brake back-up release on a towed vehicle and other vehicles, comprising: valve means operable to normally permit flow of hydraulic fluid therethrough to operate one or more disc brakes when braking the forward movement of the vehicle is desired, check valve means in a fluid circuit with said valve means, actuator means operable to automatically actuate said valve means upon backward movement of the vehicle, and accumulator means in the fluid circuit for accumulating hydraulic fluid received when said one or more disc brakes are released by actuation of said actuator means, said valve means upon backward movement of the vehicle being operable to release hydraulic fluid from a caliper cylinder of the disc brake and permit the hydraulic fluid to flow into said accumulator means whereby said at least one disc brake is released from any braking operation unit forward movement of the vehicle is resumed, said accumulator means being operable upon resumption of forward movement of the vehicle to cause the hydraulic fluid accumulated therein to flow back into the fluid circuit through said check valve means to enable resumption of normal operation of the one or more disc brakes.

DESCRIPTION OF THE PREFERRED EMBODIMENTS

With reference now to the drawings, but without being limited thereto, a description of the invention will now be made. Like numerals in different figures designate like elements.

Figure 1:
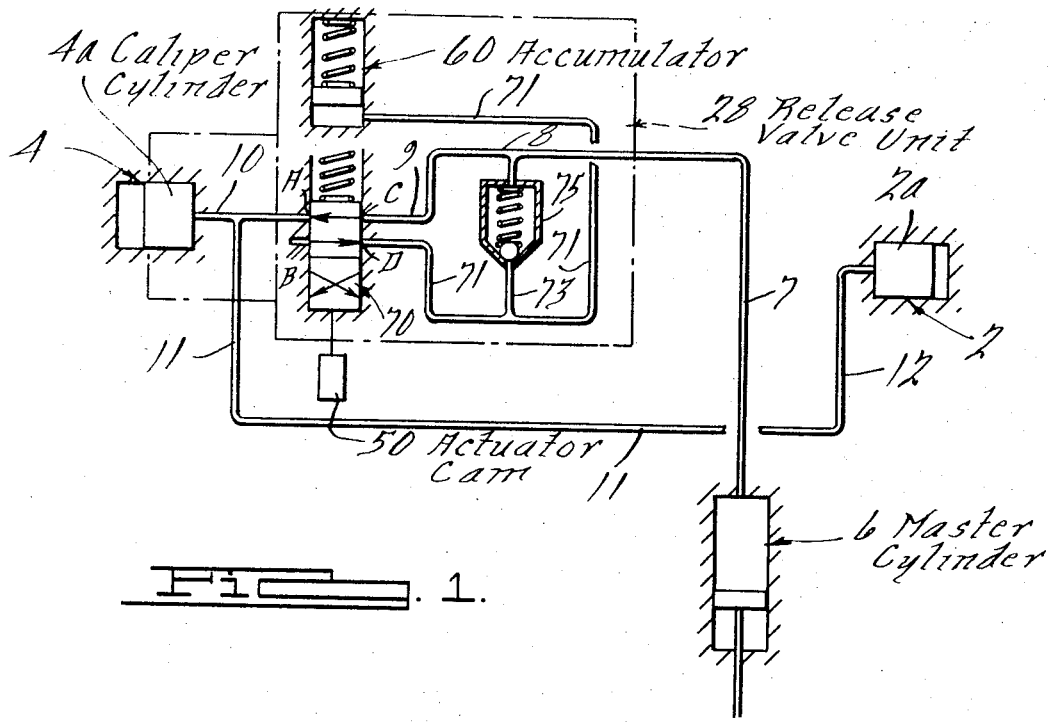
FIG. 1 illustrates a disc braking and back-up release system for use on trailers and towed vehicles in schematic form.

FIG. 1 shows the hydraulic circuitry for the back-up release system of this invention, and the system includes corresponding right and left hand calipers 2 and 4, respectively, for the disc brake on each side of the towed vehicle, not shown. The calipers 2 and 4 are actuated to brake the towed vehicle by hitch actuation of the master cylinder generally designated 6, which master cylinder 6 is put into operation by a conventional trailer hitch actuator, for example the type in U.S. Pat. No. 3,175,649. In normal stopping or braking of the towed vehicle, brake fluid from the master cylinder 6 passes through the conduits 7, 8, 9, 10, 11 and 12 to actuate the disc brakes through calipers 2 and 4.

FIG. 2 includes rotating disc or rotor 20, a hub 22 which rotates for example on bearings, not shown, a spindle 24 which is fixed, a caliper mounting bracket 26, a three-way release valve unit generally designated 28 (also shown in schematic block form designated 28 in FIG. 1), valve mounting bracket 30, mounting bolts 32, and a release valve adjusting screw 27 mounted on a bracket arm 29 which extends from the caliper mounting bracket 26. FIG. 2 also shows the caliper 4 and a double-ended arrow 35 which indicates either forward or reverse movement of the towed vehicle and corresponding rotation of the rotor 20.

Figure 3:
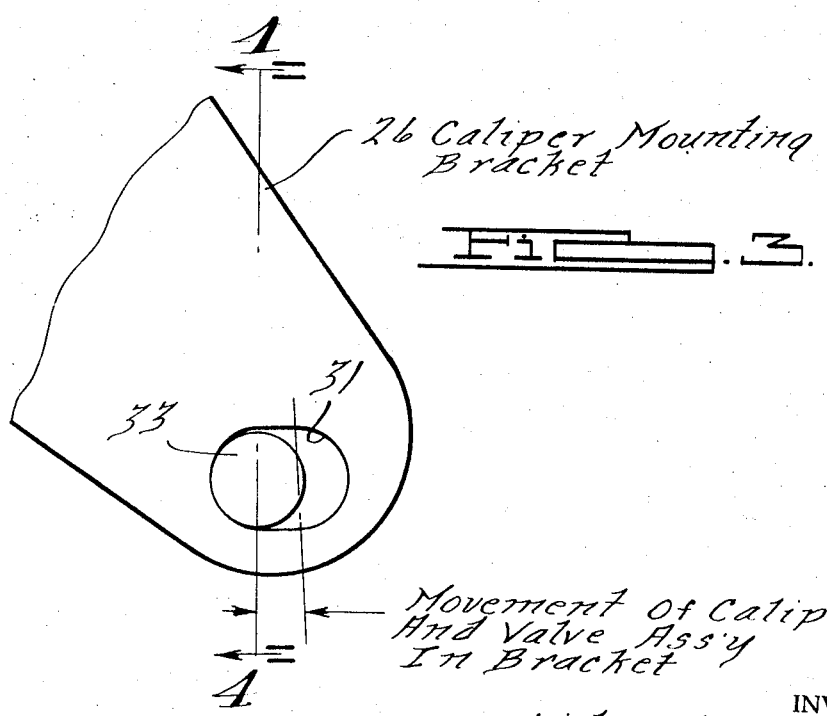
FIG. 3 illustrates a view of the caliper mounting bracket of FIG. 2 in greater detail.

FIG. 3 illustrates the right hand end of the caliper mounting bracket 26 showing the slot 31 formed therein through which there is extended the bolt 32 (also shown in FIG. 4). A corresponding loose fit slot and bolt mounting arrangement is used for mounting of the other bolt 32 at the left hand side of the caliper mounting bracket 26 shown in FIG. 2.

FIG. 4 illustrates a typical cross section taken through the loose fit slot and bolt mounting arrangement of FIG. 3, along the line 4—4 thereof.

FIG. 5 illustrates a view from the side of FIG. 2 showing how the cam member 50 of the valve unit 28 is positioned for actuation by the camming surface 27a of the adjusting screw 27. The camming member 50 is also shown and designated as element 50 in FIG. 1 extending from the block form 28 which delineates schematically the release valve unit in the diagram of FIG. 1.

Operation of the disc brake back-up release system is as follows.

When the master cylinder 6 in FIG. 1 is actuated with the wheels rotating forward (as indicated by the "F" direction of the arrow designated 35 in FIG. 2), the brakes of the towed vehicle are applied in a normal manner due to the actuation of the calipers 2 and 4. However, if the master cylinder 6 is actuated and the vehicle wheels rotate rearwardly (as shown by the direction "R" of the arrow 35 in FIG. 2), the release valve 28 is actuated by the pushing inwardly of its cam member 50 (shown in FIGS. 1 and 5) and hydraulic pressure or brake fluid is blocked from the master cylinder 6 and at the same instant the brake fluid pressure is released from the caliper cylinders 2a and 4a into the accumulator designated 60.

Accomplishment of this purpose whereby the hydraulic brake fluid is released from the caliper cylinders 2a and 4a is best explained by reference to operation of the three-way valve structure designated 70 within the block diagram 28 of FIG. 1. The four points labelled A, B, C and D designate the fluid flow paths through the valve structure 70. In normal operation of the brakes on the towed vehicle, flow of brake fluid from the master cylinder 6 simply passes through the valve structure 70 by entry from the conduit 8 through the entry point C and out the exit point A from which it thereafter passes through the conduits 10 and 11 to actuate the calipers 4 and 2, respectively. When the cam member 50 is cammed inwardly, the flow of fluid through the valve structure 70 is altered such that fluid which enters the valve structure 70 at point C is blocked off at the point B and can flow no further, whereas, at the same time brake fluid pressure from the caliper cylinder 4a and also the caliper cylinder 2a is thus allowed to flow through the valve structure 70 by entry thereto at point A and exit therefrom at point D from whence it flows through the conduit 71 into the spring biased and pressurized accumulator 60. At essentially this instant, fluid flowing through the conduit 71 cannot pass up through the conduit 73 and the spring biased check valve 75 (due to the fact that the check valve 75 is held in a closed position because of the higher pressure fluid within the conduit 8 on the other side of the check valve 75, which fluid in the conduit 8 is at a higher pressure because conduit 9 is blocked or closed off at the point B as explained hereinabove).

With respect to the spring pressure of the accumulator 60, typically and for example purposes, this pressure is of approximately 50 pounds per square inch and is applied to the caliper cylinders, but this pressure is not sufficient to cause any significant braking action in that tests have shown that this amount does not cause any noticeable braking action and will not prevent the system disclosed herein from functioning properly.

As the brake fluid pressure is released from the caliper cylinders 2a and 4a, the towed vehicle may be backed up or driven in a rearward direction indefinitely.

When the wheels of the towed vehicle are returned to forward rotation as shown by the arrow direction "F" designated 35 in FIG. 2 and, the pull on the hitch actuator (not shown) is sufficient to return the master cylinder 6 to its natural position, then the spring biased accumulator 60 forces the hydraulic fluid back to the master cylinder through the check valve 75 and the conduits 71, 73 and 7 to the master cylinder 6.

Actuation of the release valve 28 and its associated cam member 50 is accomplished herein by mounting the valve unit 28 on the wheel caliper 4 (as best shown in FIGS. 2 and 4) through the use of the opposite ends of the two caliper mounting bolts designated 32 that are used to mount the caliper 4 on the caliper mounting bracket 26.

As referred to hereinabove, two circumferential slots 31 (see detail of FIG. 3), which are the same except for the difference between right and left hand orientation, are provided in the caliper mounting bracket so that the caliper 4 may rotate or move a slight distance, for example, approximately one quarter of an inch. The slight slippage provided by the slots 31 enables the valve unit 28 to move relative to the fixed caliper mounting bracket 26 during either forward or reverse movement of the rotor 20. When vehicle rearward movement or reverse rotation of the rotor 20 occurs, the valve unit 28 and the cam member 50 associated therewith is brought into contact with the fixed camming surface 27a to release the disc brakes as explained hereinabove with respect to the valve unit block diagram 28 and its interior valve structure 70.

The caliper 4 and release valve unit 28 should preferably be mounted in front of the vertical center line of the wheel spindle 24 so that the combined weight of the two units hold the valve unit 28 in a nonactuated position, or alternatively the weight may be overcome by the use of a suitable spring arrangement not shown if it is not desirable to mount the units in such a position.

The invention disclosed herein has been found to be highly advantageous, and particularly this invention overcomes serious and detrimental problems of the prior art. It is believed that the advantages of this invention should be apparent from the above description.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A system suitable for use as a disc brake back-up release on a towed vehicle and other vehicles, comprising:

valve means operable to normally permit flow of hydraulic fluid therethrough to operate one or more disc brakes when braking the forward movement of the vehicle is desired, check valve means in a fluid circuit with said valve means, actuator means operable to automatically actuate said valve means upon backward movement of the vehicle, and accumulator means in the fluid circuit for accumulating hydraulic fluid received when said one or more disc brakes are released by actuation of said actuator means, said valve means upon backward movement of the vehicle being operable to release hydraulic fluid from a caliper cylinder of the disc brake and permit the hydraulic fluid to flow into said accumulator means whereby said at least one disc brake is released from any braking operation until forward movement of the vehicle is resumed, said accumulator means being operable upon resumption of forward movement of the vehicle to cause the hydraulic fluid accumulated therein to flow back into the fluid circuit through said check valve means to enable resumption of normal operation of the one or more disc brakes, and wherein, said valve means, said check valve means, and said accumulator means are mounted within an integral structural unit, which is mounted next to said disc brake on a wheel of the towed vehicle, and wherein, said caiper member is mounted such that it is capable of slight movement relative to a caliper mounting bracket which slight movement upon backward motion of the vehicle results in a release of the disc brake, said caliper mounting bracket includes therein at least one loose fitting slot which enables said slight relative movement of the caliper member, and said caliper mounting bracket has adjustable cam surface means mounted on an end portion thereof for camming said actuator means to actuate said valve means.

* * * * *